United States Patent
Chen et al.

(10) Patent No.: US 10,565,801 B2
(45) Date of Patent: Feb. 18, 2020

(54) INFORMATION PROCESSING APPARATUS, INFORMATION PROCESSING METHOD AND USER EQUIPMENT

(71) Applicant: SONY CORPORATION, Tokyo (JP)

(72) Inventors: Chongyu Chen, Beijing (CN); Lei Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/841,445

(22) Filed: Dec. 14, 2017

(65) Prior Publication Data

US 2018/0253909 A1   Sep. 6, 2018

(30) Foreign Application Priority Data

Mar. 6, 2017   (CN) .......................... 2017 1 0127688

(51) Int. Cl.
   *G06T 19/20*   (2011.01)
   *G06T 7/33*   (2017.01)
(52) U.S. Cl.
   CPC .............. *G06T 19/20* (2013.01); *G06T 7/344* (2017.01); *G06T 2207/10024* (2013.01); *G06T 2207/10028* (2013.01)
(58) Field of Classification Search
   None
   See application file for complete search history.

(56) References Cited

U.S. PATENT DOCUMENTS

| | | | |
|---|---|---|---|
| 8,112,254 B1* | 2/2012 | Bhat | G06T 19/20 703/1 |
| 9,348,950 B2* | 5/2016 | Hodgins | G06F 17/50 |
| 2012/0176477 A1* | 7/2012 | Givon | G06T 17/00 348/46 |
| 2015/0009214 A1* | 1/2015 | Lee | G06T 17/10 345/420 |
| 2017/0091996 A1* | 3/2017 | Wei | G06T 17/20 |

* cited by examiner

*Primary Examiner* — Tize Ma
(74) *Attorney, Agent, or Firm* — Xsensus LLP

(57) ABSTRACT

The disclosure relates to an information processing apparatus, an information processing method, and a user equipment. The information processing apparatus according to an embodiment includes a processing circuitry. The processing circuitry is configured to acquire a depth map and a predetermined three-dimensional model of an object, wherein the predetermined three-dimensional model has a deformation parameter for controlling a deformation of at least a part of the predetermined three-dimensional model. The processing circuitry is further configured to determine a correspondence between a feature point in the at least a part of the predetermined three-dimensional model and a pixel of the depth map. The processing circuitry is further configured to generate a reconstructed three-dimensional model of the object, to which the deformation parameter being applicable, from the depth map based on the determined correspondence.

14 Claims, 10 Drawing Sheets

(a) Obtained from clean depth map (b) Obtained from depth map with noise (c) Obtained from depth map with quantization step and noise (a) Coarse alignment (2D view)  (b) Coarse alignment (3D view)  (c) Fine alignment after depth editing (3D view)

(a)  (b)  (c)  (d)

(a)  (b)  (c)  (d)

INFORMATION PROCESSING APPARATUS, INFORMATION PROCESSING METHOD AND USER EQUIPMENT

TECHNICAL FIELD

The present disclosure generally relates to information processing, and in particular to an information processing apparatus, an information processing method and a user equipment for reconstruction of three-dimensional model and/or optimization of depth map.

BACKGROUND

In a conventional three-dimensional (3D) reconstruction framework, what has been mainly focused on is reconstructing a surface of a static object based on a depth measurement of the object. In general, depth information can be obtained by technology such as triangulation or time-of-flight (ToF). In addition, there are a number of depth enhancement methods for improving the quality of a depth map. In a case that a high-quality depth map is obtained, 3D reconstruction of a surface of an object may be realized by fusing the depth maps. These reconstruction schemes are usually used to reconstruct static objects. With the development of technology such as RGB-D (color-depth) sensors, researchers begin to reconstruct non-rigid objects using, for example, RGB-D sequences as input, which makes it possible to reproduce an observed deformation of the surface of object.

SUMMARY

It is difficult for the 3D model reconstructed by the existing method to present possible deformations other than the observed deformation. This is because the deformation defined in these methods is controlled by consecutive frames, and there is a dense correspondence between these frames and the input RGB-D sequence.

A brief overview of embodiments of the present disclosure is given below so as to provide a basic understanding of certain aspects of the present disclosure. It is to be understood that the following summary is not an exhaustive overview of the present disclosure. It is neither intended to determine the critical or important part of the present disclosure, nor intended to limit the scope of the present disclosure. The purpose thereof is merely to give some concepts in a simplified form as a prelude to the more detailed description of the later discussion.

An information processing apparatus is provided according to an embodiment, which includes a processing circuitry. The processing circuitry is configured to acquire at least one depth map of an object and a predetermined parametric three-dimensional model, wherein the predetermined three-dimensional model has at least one deformation parameter for controlling at least one deformation of at least a part of the predetermined three-dimensional model. The processing circuitry is further configured to determine at least one correspondence between a feature point in the at least a part of the predetermined three-dimensional model and a pixel of the depth map. The processing circuitry is further configured to generate a reconstructed three-dimensional model of the object from the depth map(s) based on the determined correspondence(s), with predetermined deformation parameter(s) being applicable to the reconstructed three-dimensional model.

An information processing method is provided according to another embodiment, which includes: acquiring a depth map of an object and a predetermined three-dimensional model, wherein the predetermined three-dimensional model has a deformation parameter for controlling a deformation of at least a part of the predetermined three-dimensional model; determining a correspondence between a feature point in the at least a part of the predetermined three-dimensional model and a pixel of the depth map; and generating a reconstructed three-dimensional model of the object from the depth map based on the determined correspondence, the deformation parameter being applicable to the reconstructed three-dimensional model.

In another aspect, an information processing apparatus is provided according to an embodiment, which includes a processing circuitry. The processing circuitry is configured to: acquire a depth map of an object and a predetermined three-dimensional model; register the predetermined three-dimensional model to three-dimensional coordinate points generated from the depth map to obtain a registered three-dimensional model; and perform an optimization on the depth map based on the registered three-dimensional model.

An information processing method is provided according to another embodiment, which includes: acquiring a depth map of an object and a predetermined three-dimensional model; registering the predetermined three-dimensional model to three-dimensional coordinate points generated from the depth map to obtain a registered three-dimensional model; and performing an optimization on the depth map based on the registered three-dimensional model.

Further, embodiments of the present disclosure further include a user equipment, which includes a user interface device for receiving an operation instruction from a user. The user equipment includes or is communicatively coupled to the information processing apparatus according to the above-described embodiment, the operation instruction including an instruction of specifying or selecting the predetermined three-dimensional model, an instruction of specifying or adjusting the deformation parameter, or an instruction related to the registration.

According to the embodiments in the above aspects, a parameterized and deformable 3D model can be reconstructed, a way of reconstructing a semantic 3D model from original input data is provided. Further, the optimization of depth data can be performed effectively based on an existing 3D model.

BRIEF DESCRIPTION OF THE DRAWINGS

The present disclosure may be better understood with reference to the following description given in conjunction with the drawings in which same or similar reference numerals are used throughout the drawings to refer to the same or like parts. The drawings, together with the following detailed description, are included in this specification and form a part of this specification, and are used to further illustrate preferred embodiments of the present disclosure and to explain the principles and advantages of the present disclosure. In the drawings.

DETAILED DESCRIPTION OF THE EMBODIMENTS

Figure 1:
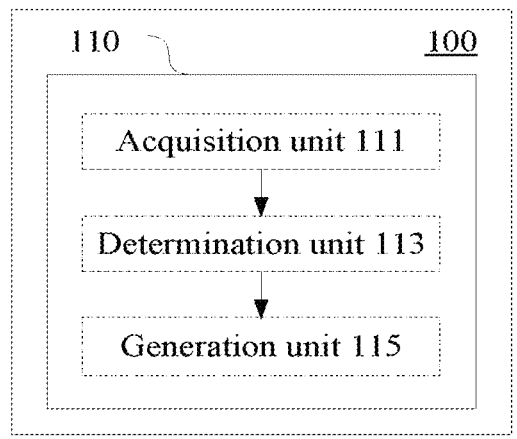
FIG. 1 is a block diagram illustrating a configuration example of an information processing apparatus according to an embodiment of the present disclosure.

Hereinafter, embodiments of the present disclosure will be described with reference to the drawings. Elements and features described in one of the drawings or embodiments of the present disclosure may be combined with elements and features shown in one or more other drawings or embodiments. It should be noted that, for the purpose of clarity, indication and description of components and processing irrelevant to the present disclosure and known by those skilled in the art are omitted in the drawings and the explanation.

FIG. 1 illustrates a configuration example of an information processing apparatus 100 according to an embodiment of the present disclosure. For example, the information processing apparatus may be implemented as a personal computer (such as a desktop computer and a laptop computer), a work station, a game machine (such as a motion sensing game machine), a television, a mobile terminal (such as a smart phone, a tablet computer and a portable game terminal) or an image capturing device (such as a camera and a monitor). However, the application of embodiments of the present disclosure is not limited to the above, but may be applied to any apparatus capable of obtaining a depth image, or any apparatus communicatively or electrically coupled with an apparatus capable of obtaining a depth image to process the depth image.

As shown in FIG. 1, the information processing apparatus 100 according to the present embodiment includes a processing circuitry 110. For example, the processing circuitry 110 may be implemented as a particular chip, a chipset, a central processing unit (CPU) or the like.

The processing circuitry 110 includes an acquisition unit 111, a determination unit 113 and a generation unit 115. It should be noted that, although the acquisition unit 111, the determination unit 113 and the generation unit 115 are shown in form of functional blocks in the drawings, it should be understood that, the functions thereof may also be realized by the processing circuitry 110 as a whole, rather than being realized by actual discrete components of the processing circuitry 110. In addition, although the processing circuitry 110 is shown by one block in the diagram, the information processing apparatus 100 may include multiple processing circuitries, and functions of the acquisition unit 111, the determination unit 113 and the generation unit 115 may be distributed among the multiple processing circuitries, so that the multiple processing circuitries perform these functions cooperatively.

The acquisition unit 111 is configured to acquire a depth map of an object and a predetermined three-dimensional model. The predetermined three-dimensional model has a deformation parameter for controlling a deformation of at least a part of the predetermined three-dimensional model.

For example, the depth map may be obtained by a depth image capturing device in real time, or may be obtained from depth data previously obtained and stored in a storage device.

In addition, as an example of a predetermined three-dimensional model, there have been a variety of 3D models that can control a movement of a specific part by a parameter. The deformations of these models (usually hundreds or thousands of voxels are changed) are usually controlled by a small number of parameters. These parameterized models are typically used to reconstruct a non-rigid surface of interest, such as a human face. As an example, FaceShift is a representative commercial software that uses parameterized deformation to reconstruct a face, and can be used for transferring an facial expression.

Correspondingly, in an exemplary embodiment, the object or a movable part of the object may include a human face.

The determination unit 113 is configured to determine a correspondence between a feature point in the at least a part of the predetermined three-dimensional model obtained by the acquisition unit 111 and a pixel of the depth map obtained by the acquisition unit 111. Feature points in the model may be determined in various ways according to specific applications. As an example, the feature points may include vertices in the model. However, the feature points may not contain all the vertices in the model. For example, the feature points may only contain vertices in an area of interest, or may contain representative vertices extracted from the vertices with a specific density (or spacing).

As an example, the correspondence between the feature point of the 3D model and the pixel of the depth map may be determined by registering the predetermined three-dimensional model to a point cloud generated based on the depth map, and projecting the registered feature points to an image plane of the depth map. The above-described projection process may provide a dense correspondence between the pixels and the voxels, that is, a voxel projected to an image plane is considered to be corresponding to a pixel onto which the voxel is projected.

For example, the predetermined three-dimensional model may be registered to a point cloud by using an iterative closest point (ICP) method.

As known in the art, the ICP method includes a rigid ICP method and a non-rigid ICP method. The embodiment of the present disclosure may include the above two registration methods, and may include performing the above two registration methods iteratively. For example, a registration process may include: performing an overall rigid registration on the predetermined three-dimensional model and the point cloud; on the basis of the rigid registration, adjusting a deformation parameter to perform a local non-rigid registration on the predetermined three-dimensional model and the point cloud; performing the rigid registration and the non-rigid registration iteratively. During the iteration, a user instruction may be referred to for improving the registration accuracy, such that the shape of the predetermined three-dimensional model is fitted to the point cloud.

The generation unit 115 may generate a reconstructed three-dimensional model of the object from the depth map based on the correspondence determined by the determination unit 113, wherein the deformation parameter being applicable to the reconstructed three-dimensional model.

Specifically, the generation of the reconstructed three-dimensional model may include, for example: determining a topological relationship of pixels of the depth map from a topological relationship of feature points of the predetermined three-dimensional model, based on the correspondence between feature points of the predetermined three-dimensional model and pixels of the depth map determined by the determination unit 113; and determining a topological relationship between feature points of the reconstructed three-dimensional model based on the topological relationship between the pixels of the depth map.

Next, a specific example is described to explain the process of performing depth fusion by topology transfer, i.e., the process of generating the reconstructed three-dimensional model to which the deformation parameter is applicable. It is to be understood that the provided examples are only illustrative and are not intended to limit the present disclosure to the specific details of these examples.

In a case that the correspondence between the feature points (take vertices as an example to describe hereinafter) of the predetermined three-dimensional model and the pixels in the depth map of the object has been determined, a vertex topological relationship is extracted from the predetermined three-dimensional model and transferred to a pixel domain. Then, the depth map is fused to reconstruct a three-dimensional model represented in form of voxel. In this way, the topological relationship is transferred from pixel domain to voxel domain.

Figure 13A:
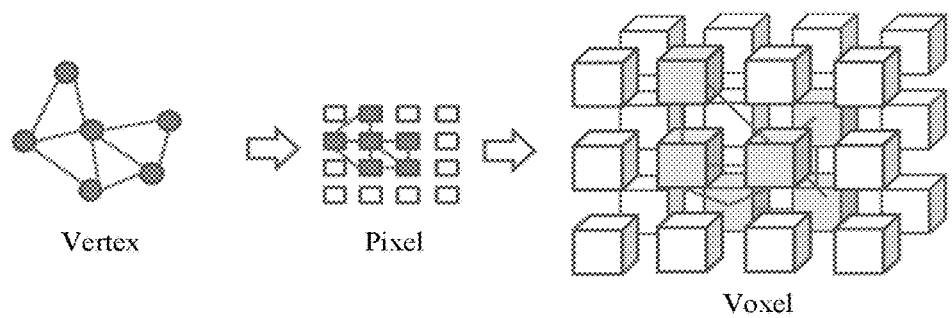
FIGS. 13A and 13B are schematic diagrams for illustrating a topology transfer.

FIG. 13 illustrates two possible manners of converting the vertex topological relationship into a voxel topological relationship. In a first manner as shown in FIG. 13A, adjacent vertices are projected to adjacent pixels of the depth map. In this case, the vertices have dense correspondences in the pixel domain. Such topology can be naturally reproduced in the voxel domain because volumetric representation has the assumption that adjacent voxels are connected.

Figure 13B:
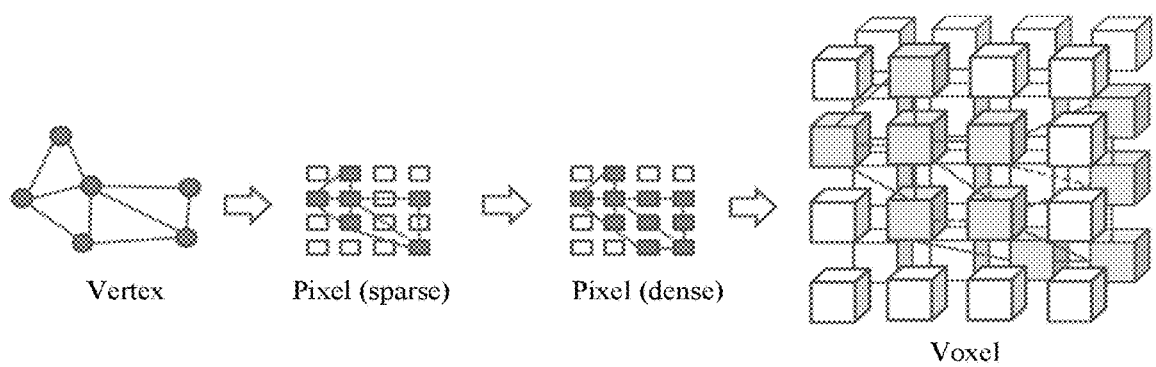

In another manner as shown in FIG. 13B, vertices are sparsely projected to the pixel domain. To obtain dense correspondence that can be naturally transferred to the voxel domain, depth interpolation and topological expansion may be used according to an embodiment. In particular, the depth interpolation may be performed in the voxel domain by the typical non-uniform rational B-spline (NURBS) method or may be performed in the pixel domain by the typical bicubic interpolation method. Topological expansion may be performed by adding pixels on connection edges into the topology.

It should be noted that for different frames, the results of topology transfer may be different. Correspondingly, according to an embodiment, in a case that two or more pixels in two or more depth maps correspond to the same feature point in the predetermined three-dimensional model, topology transfer may be performed by: obtaining one pixel position corresponding to the feature point by a coordinate averaging; dividing a three-dimensional space into voxels, converting the depth map into a three-dimensional point cloud, determining a relationship between the point cloud and the voxels according to a nearest neighbor principle; merging a plurality of three-dimensional point clouds to obtain a voxel-based reconstructed 3D model, a voxel with a value serves as a feature point of the reconstructed three-dimensional model; and determining the topological relationship between feature points of the reconstructed three-dimensional model based on the correspondence of the pixels of the depth map, the point cloud and the voxels.

In a specific example described in the following, it is assumed that all the dynamic vertices in the pre-determined three-dimensional model are visible in one depth map, and two topology transfer results are merged using simple averaging. That is, for two vertices in the voxel domain that correspond to the same vertex of the predetermined three-dimensional model, the merging process can be represented by the following equation (1):

$$\{x_0, y_0, z_0\} = 0.5\{x_1, y_1, z_1\} + 0.5\{x_2, y_2, z_2\}, \qquad \text{Equation (1)}$$

where $\{x_0, y_0, z_0\}$ is a vertex in the merging result, $\{x_1, y_1, z_1\}$ and $\{x_2, y_2, z_2\}$ are two individual results. In this way, the number of vertices in the voxel domain is kept unchanged, which is identical to the number of vertices in the predetermined three-dimensional model.

However, the transferred topology may not be completely the same as the actual topology. For example, FIG. 13B shows a sparse transferred topology and a denser actual topology of the voxels. In general, the actual topology is denser than the transferred one because adjacent voxels will be connected together in the volumetric representation during a mesh extraction process.

After depth fusion, the three-dimensional model (referred to as the reconstructed three-dimensional model herein) of the object is reconstructed. The reconstructed three-dimensional model, the transferred topology, and the deformation parameters defined for the topology (i.e., the deformation parameter defined for the predetermined three-dimensional model) constitute a new parameterized three-dimensional model. By changing the deformation parameters, the new three-dimensional model (the reconstructed three-dimensional model) may deform in a way similar to that of the predetermined three-dimensional model.

Above described is an exemplary embodiment of generating a reconstructed three-dimensional model based on a depth map of an object and a predetermined three-dimensional model with deformation parameters, the deformation parameter being applicable to the reconstructed three-dimensional model. Further, according to some embodiments, the predetermined three-dimensional model may also be used to optimize the depth map.

Figure 2:
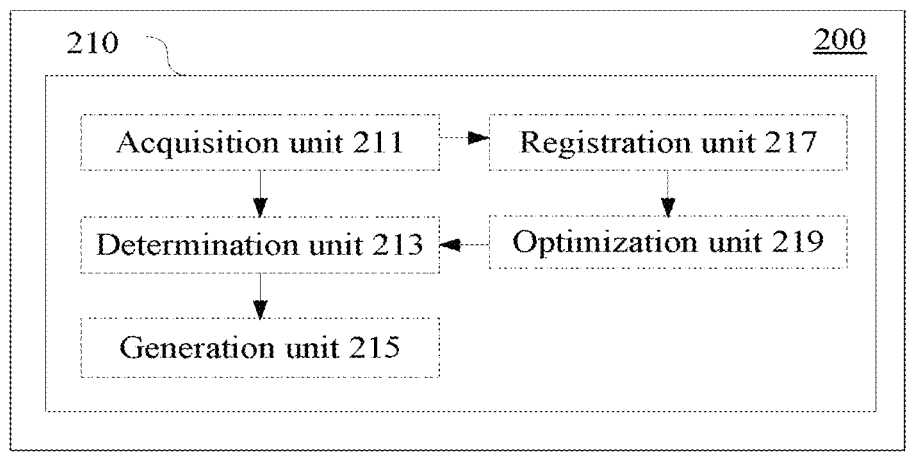
FIG. 2 is a block diagram illustrating a configuration example of an information processing apparatus according to another embodiment.

As shown in FIG. 2, an information processing apparatus 200 according to an embodiment includes a processing circuitry 210. The processing circuitry 210 includes an acquisition unit 211, a determination unit 213, a generation unit 215, a registration unit 217 and an optimization unit 219. The acquisition unit 211, the determination unit 213 and the generation unit 215 are similar to the acquisition unit 111, the determination unit 113 and the generation unit 115 described with reference to FIG. 1, respectively, the description of which is omitted here.

The registration unit 217 is configured to register the predetermined three-dimensional model acquired by the acquisition unit 211 to a point cloud generated based on the depth map acquired by the acquisition unit 211, to obtain a registered three-dimensional model.

For example, the registration of the predetermined three-dimensional model to the point cloud may be performed using the above-mentioned manner such as the ICP method.

The optimization unit 219 is configured to optimize the depth map acquired by the acquisition unit 211 based on the registered three-dimensional model obtained by the registration unit 217.

According to an embodiment, the optimization unit 219 may be configured to derive an optimized depth map by solving an objective function containing a first fidelity term related to a depth value of a current depth map of the object and a second fidelity term related to a depth value of a depth map obtained based on the registered three-dimensional model. In addition, the objective function may further include a regularization term for preserving a smoothness of the optimized depth map.

The above process is equivalent to a guided depth editing process. Next, the process is described in more details with an example.

For a given sequence of depth maps and a given predetermined three-dimensional model (optionally, a corresponding intensity map such as a color image may also be included), the proposed depth editing process is used to generate a sequence of new depth maps with optimized depth value and pixel-vertex correspondences.

For a depth map Z, the guided depth editing is formulated as an optimization problem that consists of the following three parts:

$$\operatorname*{argmin}_{X} \frac{1}{2}\|X - Z\|_2^2 + \qquad \text{Equation (2)}$$

$$\alpha \sum_{p \in \Omega_i} \sum_{q \in \Omega_q} \frac{1}{2} \lambda_{pq}(X(p) - X(q))^2 + \frac{\beta}{2}\|X - Z^*\|_2^2$$

The first part $\|X-Z\|_2^2$ in the Equation (2) is the fidelity term that preserves basic content of the depth map, where X represents the output depth map.

The second part $$\alpha \sum_{p \in \Omega_i} \sum_{q \in \Omega_q} \frac{1}{2} \lambda_{pq}(X(p) - X(q))^2$$

in the Equation (2) is a regularization term preserving the piece-wise smoothness of the depth map by using weighted sum of squares, where $$\lambda_{pq} \propto \exp\left[-\frac{\|p - q\|^2}{2\sigma_s^2} - \frac{(Z(p) - Z(q))^2}{2\sigma_z^2}\right] \qquad \text{Equation (3)}$$

Where $\lambda_{pq}$ is a weight reflecting a similarity between depth values $Z(p)$ and $Z(q)$, $\sigma_s$ and $\sigma_z$ are pre-defined constants.

The third part $$\frac{\beta}{2}\|X - Z^*\|_2^2$$

in the Equation (2) is another fidelity term that changes the depth values so that the point cloud converted from the depth map fits better to the predetermined three-dimensional model, where $Z^*$ is the depth map generated by rendering the fitted predetermined three-dimensional model to an image plane.

More specifically, a common point-to-plane ICP is adopted first to perform a rigid transformation from the predetermined three-dimensional model to the point cloud obtained from the current depth map X. Then, the non-rigid point-to-plane ICP may be applied in model registration for better fitting surfaces of the model to the point cloud. In the model registration, the rigid and non-rigid ICP methods may be applied iteratively to guarantee a good fitting. Thereafter, the fitted model is projected to the image plane to generate $Z^*$.

In addition, during the model registration process, the deformation parameters of the predetermined three-dimensional model may be manually adjusted so that the model can be better fitted to the point cloud.

The above projection process also provides a dense correspondence between the pixels and the vertices, i.e., the voxel that is projected on the image plane is considered to be corresponding to the pixel onto which the voxel is projected.

The first two parts of the optimization model in the Equation (2) may be used for depth enhancement, and the third part establishes a correspondence between the predetermined three-dimensional model and the depth map in the form of image domain processing. Constants α and β are balancing parameters which may be adjusted as required.

Further, processes of the above optimization, model registration, and depth rendering may be performed iteratively. Correspondingly, according to an embodiment, the registration unit 217 and the optimization unit 219 may further be configured to perform registration and optimization iteratively.

Figure 3:
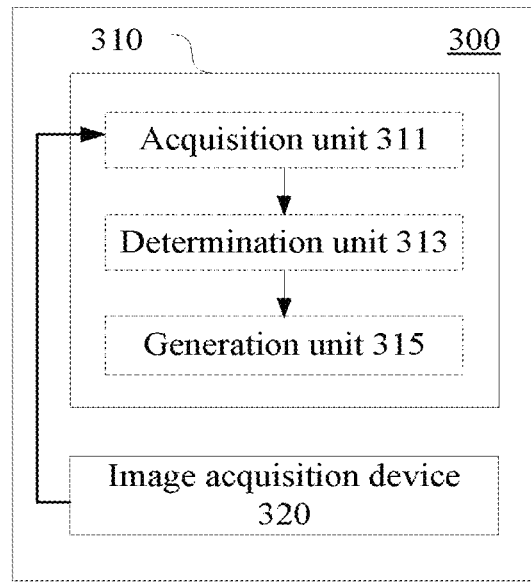
FIG. 3 is a block diagram illustrating a configuration example of an information processing apparatus according to yet another embodiment.

As described above, the depth map may be acquired by a depth image capturing device in real time. Correspondingly, according to an embodiment, the information processing apparatus may include an image acquisition device. FIG. 3 illustrates a configuration example of an information processing apparatus according to the present embodiment.

The information processing apparatus 300 includes a processing circuitry 310 and an image acquisition device 320. The processing circuitry 310 includes an acquisition unit 311, a determination unit 313 and a generation unit 315, which are similar to the acquisition unit 111, the determination unit 113 and the generation unit 115 described with reference to FIG. 1, respectively, the description of which is omitted here.

The image acquisition device 320 is configured to acquire a depth map of an object. The acquisition unit 311 of the processing circuitry 310 may acquire the depth map from the image acquisition device 320.

Further, the image acquisition device 320 may further acquire an intensity map such as a color image of the object, and the intensity image may, for example, be used to assist or guide the registration between the predetermined three-dimensional and the depth map.

The image acquisition device 320 may include, for example, a depth sensor or any existing apparatus capable of generating a depth image, such as Kinect sensor from the Microsoft corporation, a RealSense sensor from the Intel corporation and other mixed depth acquiring system. Further, the image acquisition device 320 may also include an RGB-D data collection device including a depth image capturing device such as a depth sensor and an intensity image capturing device such as a color camera. Specifically, the color camera, for example, can collect a consecutive color image sequence, which may be any camera on the market; and the depth sensor collects a consecutive depth map sequence, and may be structured light depth acquisition device such as the Kinect, or may be a ToF camera.

Deformation of the reconstructed three-dimensional model of the object may be controlled by a user after the reconstructed three-dimensional model of the object, to which the deformation parameter is applicable, is generated according to the above embodiment. Further, as described above, during the model registration process, for example, the deformation parameters of the predetermined three-dimensional model may be manually adjusted so that the model can better fit to the point cloud. Correspondingly, the information processing apparatus according to an embodiment may be configured to receive input from a user.

Figure 4:
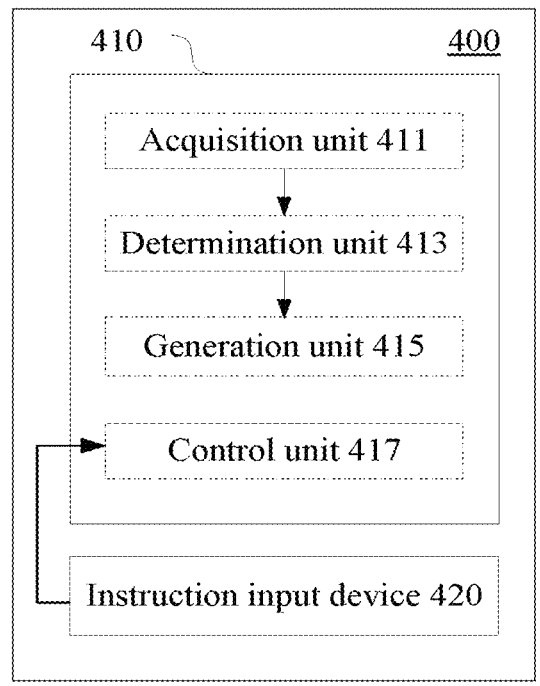
FIG. 4 is a block diagram illustrating a configuration example of an information processing apparatus according to still another embodiment.

As shown in FIG. 4, an information processing apparatus 400 according to an embodiment includes a processing circuitry 410 and an instruction input device 420. The processing circuitry 410 includes an acquisition unit 411, a determination unit 413, a generation unit 415 and a control unit 417. Specifically, the acquisition unit 411, the determination unit 413 and the generation unit 415 are similar to the acquisition unit 111, the determination unit 113 and the generation unit 115 described with reference to FIG. 1, respectively, the description of which is omitted here.

The instruction input device 420 is configured to acquire an operation instruction from a user. The control unit 417 is configured to control a deformation of the reconstructed three-dimensional model and/or the predetermined three-dimensional model based on the operation instruction inputted via the instruction input device 420.

In addition, according to an embodiment, the control of the deformation may include guiding movement of a feature point without topology information based on topology information of an adjacent feature point.

Specifically, a voxel or a vertex located in a deformable topology region but without a topology definition may be changed in a smooth way by using deformation interpolation. For example, for a vertex $v_i$ without a topology definition, its adjacent vertices may be searched for, and the movement of the vertex $v_i$ is guided by using a subset of vertices with topology definitions, i.e., $$T_{v_i} = \sum_{j \in \Omega_i} c_j T_{v_j} \quad \text{Equation (4)}$$

where T represents the 6-DOF three-dimensional transformation whose index indicates the vertex to be transformed, $\Omega_i$ indicates a subset of vertices with topology definitions, and $c_j$ is a coefficient for a vertex $v_j$. The relation of $c_j \propto 1/\|v_i - v_j\|_2^2$ may be defined, where $$\sum_{j \in \Omega_i} c_j = 1,$$

for smooth transformation.

Next, an overall configuration and an overall process of information processing according to an exemplary embodiment are described with reference to FIG. 11 and FIG. 12. It is to be noted that the following examples include features of the various aspects of the above-described embodiments in order to facilitate a more complete understanding of the above-described embodiments, but the embodiments of the present disclosure do not necessarily need to include all of these features.

Figure 11:
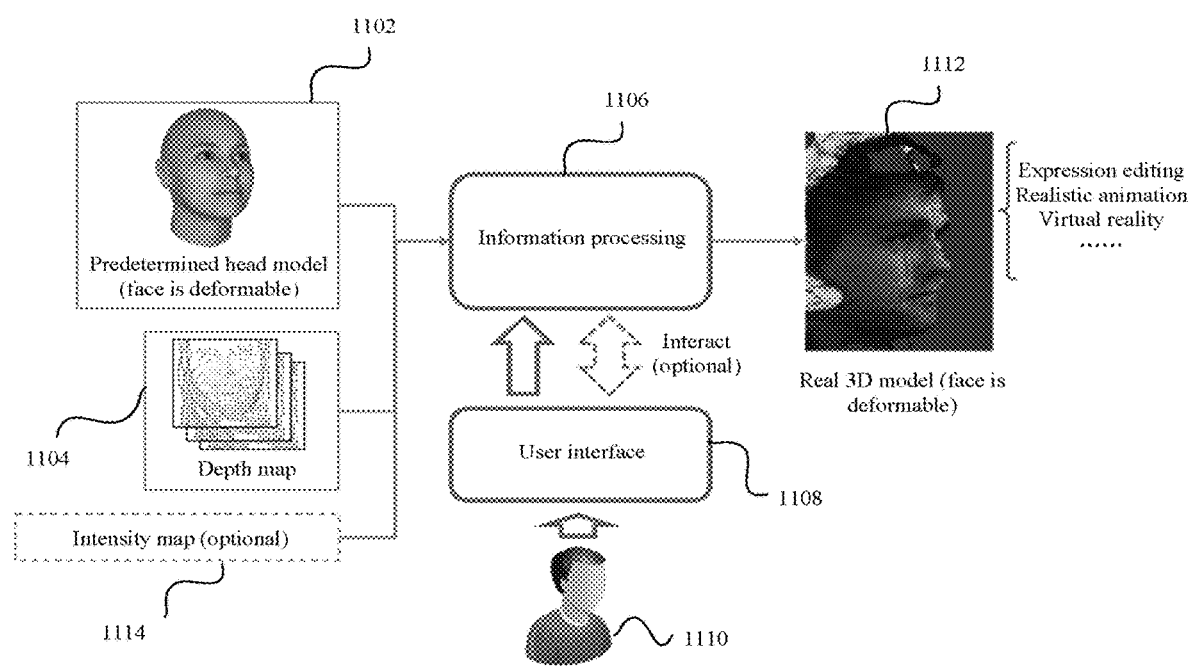
FIG. 11 is a schematic diagram for illustrating an overall configuration of an information processing in an exemplary embodiment according to the present disclosure.

Information processing 1106 as shown in FIG. 11, for example, may be implemented in hardware or software, which acquires a predetermined three-dimensional model such as a head model 1102 and depth data of an object such as a depth map 1104 from a data source. The predetermined three-dimensional model has a deformation parameter. The object whose three-dimensional model is to be reconstructed (such as a head of a human in the example) may have dynamic characteristics similar to the predetermined three-dimensional model. Optionally, an intensity map 1114 such as a color image synchronized with the depth map may further be acquired.

A user 1110 may select a predetermined three-dimensional model having a predetermined deformable surface for an object via a user interface 1108, for example. Next, a depth map (optionally, and a corresponding color image) of the real object may be loaded. The depth map and the color image may be obtained from, for example, an RGB-D sensor, or from a pre-stored file. Next, the information processing 1106 performs processes corresponding to the above-described embodiment to obtain a reconstructed three-dimensional model 1112. Deformation of the reconstructed three-dimensional model may be controlled through the deformation parameter so as to realize functions such as expression editing, realistic animation or virtual reality.

During the information processing 1106, interaction with the user may be performed in a manner described in the above exemplary embodiment, to manually adjust a fitting result in a depth editing process, for example. The information processing 1106 may be performed by the information processing apparatus according to the above-described embodiment of the present disclosure. A user interface 1108 and the information processing apparatus according to the above-described embodiment of the present disclosure may be integrated into the same user equipment; alternatively, the user interface 1108 may be implemented as a separate user equipment communicatively coupled with the information processing apparatus according to the above-described of the present disclosure. In particular, with respect to the user equipment, the information processing 1106 may be performed in a cloud, for example. The user equipment may be implemented as, for example, a personal computer, a work station, a game machine, a television, a mobile terminal (such as a smart phone, a tablet computer and a portable game terminal) or an image capturing device (such as a camera and a monitor). However, the application of embodiments of the present disclosure is not limited to the above. Further, the user interface may include any apparatus capable of obtaining a user instruction (and presenting information to the user).

Figure 12:
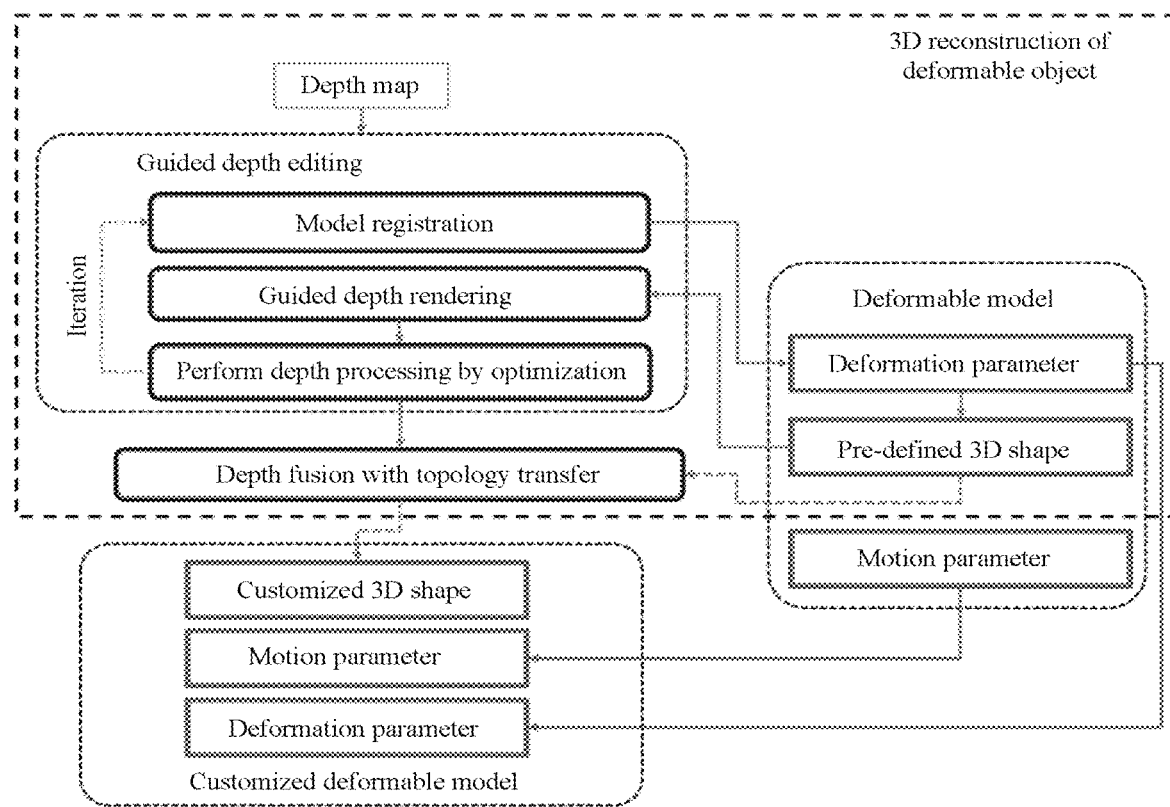
FIG. 12 is a schematic diagram for illustrating an overall process of an information processing in an exemplary embodiment according to the present disclosure.

FIG. 12 illustrates an overall framework of a three-dimensional reconstructing process of a deformable object according to an exemplary embodiment, which involves processes of three-dimensional reconstruction, depth enhancement and three-dimensional model registration. Specifically, the predetermined three-dimensional model is introduced to a conventional three-dimensional reconstruction framework by guided depth editing. The proposed reconstructed framework can reconstruct a three-dimensional model having a predetermined motion parameter after a topology transfer is performed in depth fusion processing. Various types of deformable objects can be processed by the framework.

In the description of the information processing apparatus according to the embodiment of the present disclosure, some methods and processes are also disclosed apparently. Next, an explanation of the information processing method according to an embodiment of the present disclosure is given without repeating the details described above.

Figure 5:
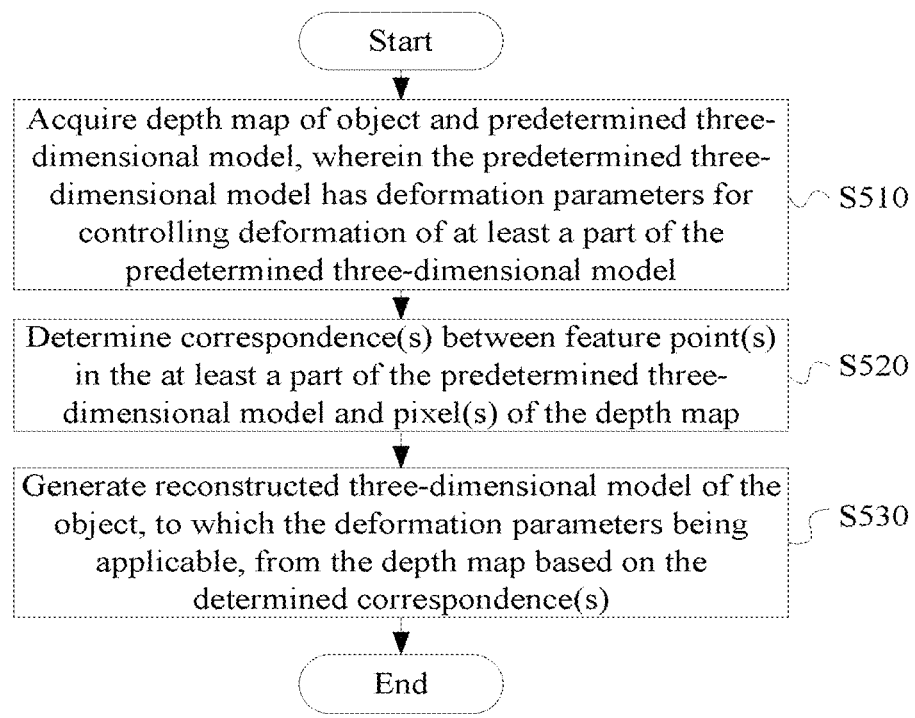
FIG. 5 is a flowchart illustrating a process example of an information processing method according to an embodiment of the present disclosure.

As shown in FIG. 5, the information processing method according to the present embodiment includes the following steps.

In step S510, a depth map of an object and a predetermined three-dimensional model are acquired, wherein the predetermined three-dimensional model has a deformation parameter for controlling a deformation of at least a part of the predetermined three-dimensional model.

In step S520, a correspondence between a feature point in the at least a part of the predetermined three-dimensional model and a pixel of the depth map is determined.

In step S530, a reconstructed three-dimensional model of the object is generated from the depth map based on the determined correspondence, the deformation parameter being applicable to the reconstructed three-dimensional model.

Embodiments of generating a deformable three-dimensional model of an object are described above. In another aspect, the present disclosure further includes an embodiment of optimizing a depth map of an object based on a predetermined three-dimensional model.

Figure 6:
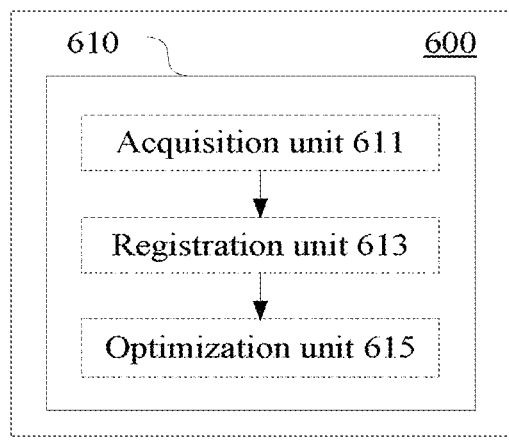
FIG. 6 is a block diagram illustrating a configuration example of an information processing apparatus according to another embodiment of the present disclosure.

As shown in FIG. 6, an information processing apparatus 600 according to an embodiment includes a processing circuitry 610. The processing circuitry 610 includes an acquisition unit 611, a registration unit 613 and an optimization unit 615.

The acquisition unit 611 is configured to acquire a depth map of an object and a predetermined three-dimensional model.

The registration unit 613 is configured to register the predetermined three-dimensional model to three-dimensional coordinate points (for example, a point cloud) generated from the depth map, to obtain a registered three-dimensional model.

The optimization unit 615 is configured to perform an optimization on the depth map based on the registered three-dimensional model.

According to an embodiment, the optimization unit 615 may be configured to derive an optimized depth map by solving an objective function containing a first fidelity term related to a depth value of a current depth map of the object and a second fidelity term related to a depth value of a depth map obtained based on the registered three-dimensional model. In addition, the objective function may further include a regularization term for preserving a smoothness of the optimized depth map.

Further, according to an embodiment, the registration unit 613 and the optimization unit 615 may be configured to perform the registration and the optimization iteratively.

Figure 7:
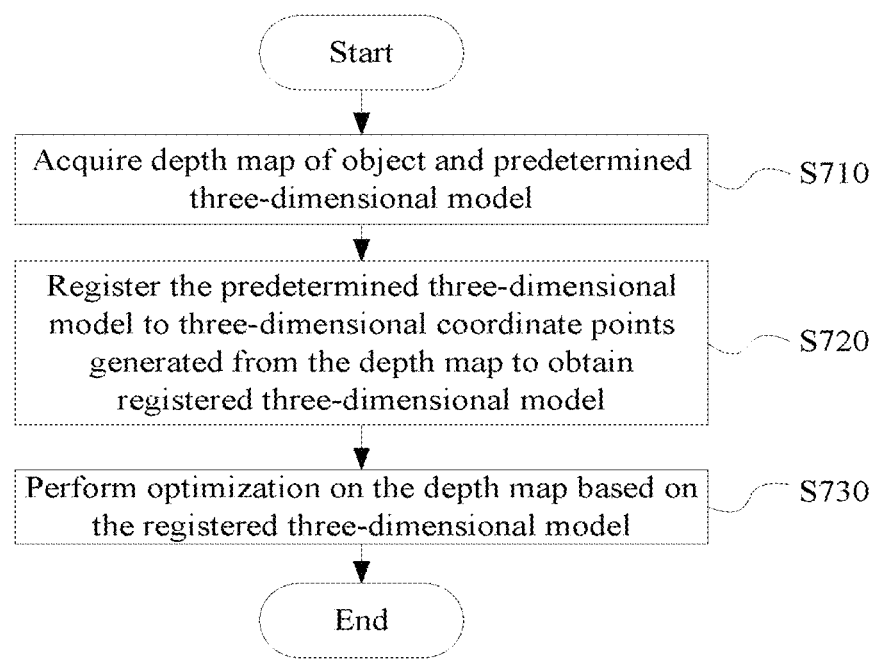
FIG. 7 is a flowchart illustrating a process example of an information processing method according to another embodiment of the present disclosure.

FIG. 7 illustrates an information processing method according to an embodiment, which includes the following steps.

In step S710, a depth map of an object and a predetermined three-dimensional model are acquired.

In step S720, the predetermined three-dimensional model is registered to three-dimensional coordinate points (for example, a point cloud) generated from the depth map, to obtain a registered three-dimensional model.

In step S730, an optimization is performed on the depth map based on the registered three-dimensional model.

Figure 8:
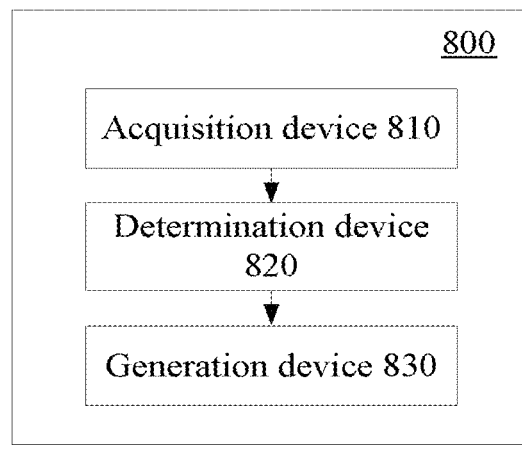
FIG. 8 is a block diagram illustrating a configuration example of an information processing apparatus according to an embodiment of the present disclosure.
Figure 9:
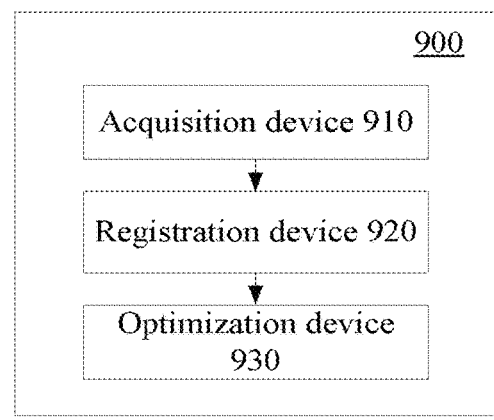
FIG. 9 is a block diagram illustrating a configuration example of an information processing apparatus according to another embodiment of the present disclosure.

FIG. 8 and FIG. 9 illustrate additional configuration examples of information processing apparatus according to the embodiment in the above aspects.

As shown in FIG. 8, an information processing apparatus 800 according to an embodiment includes an acquisition device 810, a determination device 820 and a generation device 830. The acquisition device 810 is configured to acquire a depth map of an object and a predetermined three-dimensional model, wherein the predetermined three-dimensional model has a deformation parameter for controlling a deformation of at least a part of the predetermined three-dimensional model. The determination device 820 is configured to determine a correspondence between a feature point in the at least a part of the predetermined three-dimensional model and a pixel of the depth map. The generation device 830 is configured to generate a reconstructed three-dimensional model of the object from the depth map based on the determined correspondence, the deformation parameter being applicable to the reconstructed three-dimensional model.

As shown in FIG. 9, an information processing apparatus 900 according to another embodiment includes an acquisition device 910, a registration device 920 and an optimization device 930. The acquisition device 910 is configured to acquire a depth map of an object and a predetermined three-dimensional model. The registration device 920 is configured to register the predetermined three-dimensional model to three-dimensional coordinate points generated from the depth map, to obtain a registered three-dimensional model. The optimization device 930 is configured to perform an optimization on the depth map based on the registered three-dimensional model.

Further, embodiments of the present disclosure may further include a user equipment including a user interface device such as a user interface 1108 as shown in FIG. 11. The user interface device is configured to receive an operation instruction from a user. The user equipment includes or is communicatively coupled to the information processing apparatus according to the above-described embodiment, the operation instruction including an instruction of specifying or selecting the predetermined three-dimensional model, an instruction of specifying or adjusting the deformation parameter, or an instruction of specifying or selecting the predetermined three-dimensional model or an instruction related to the registration.

The solution according to the embodiments of the present disclosure may be used to reconstruct many types of objects having parameterized deformation definition, for example, a human head having a deformable face, a human arm having a deformable hand, an animal having deformable legs, a vehicle having deformable doors. The solution provides three-dimensional reconstruction with semantics and parameterized deformation.

Next, taking reconstruction of a head of a human as an example, the process and effect of an exemplary embodiment are described. In the example, a three-dimensional face model "FaceWarehouse" is used as an example of the predetermined three-dimensional model having a vertex topology to which deformation may be applied. A test depth map is obtained from a data set consisting of three-dimensional face expressions of many people.

Figure 14:
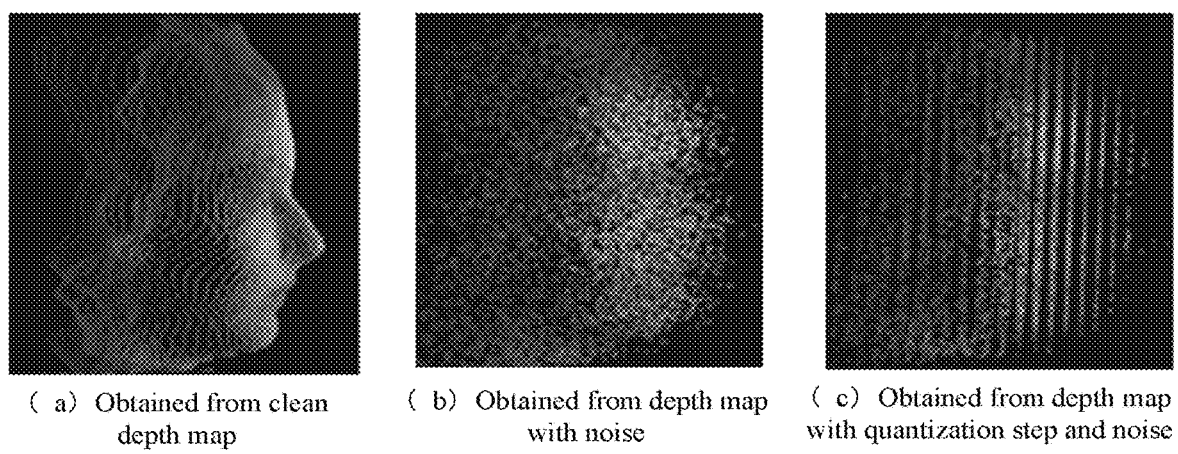
FIG. 14 is a diagram illustrating a generating process of a depth image for testing a processing effect of an exemplary embodiment of the present disclosure.

To test the robustness, a depth map similar to Kinect is generated. That is, noise and quantized step size are added into clean depth data to simulate depth data obtained in an actual application. FIG. 14 illustrates a status of the depth data involved in the generating process, specifically, (a) is a point cloud obtained based on a clean depth map; (b) is a point cloud obtained based on a depth map with noise; and (c) is a point cloud obtained based on a depth map to which the effect of quantization step is further added.

Figure 15:
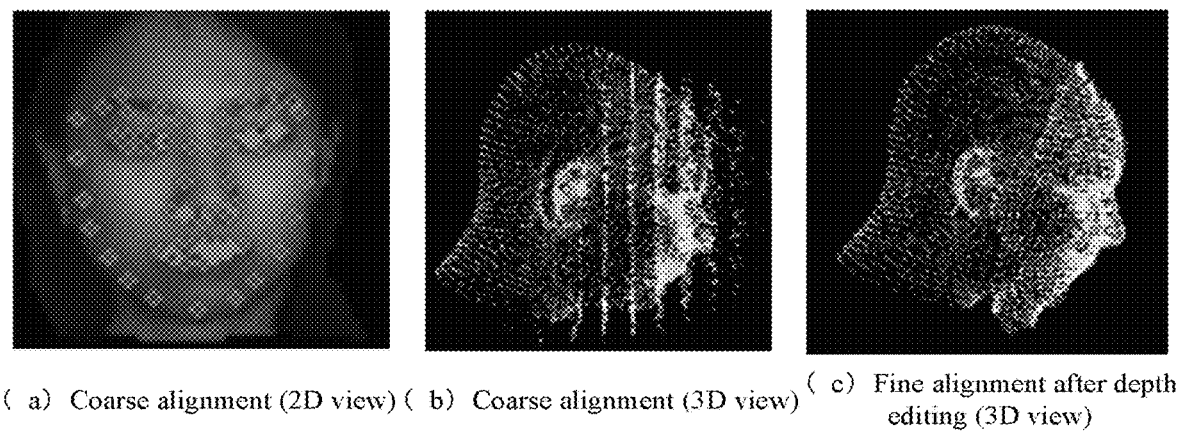
FIG. 15 illustrates an example of a processing effect of model registration according to an exemplary embodiment of the present disclosure.

Using the face model as the predetermined three-dimensional model, a guided depth editing may be performed in a coarse-to-fine manner. In a coarse alignment, a face may be detected by an existing face detecting method, and two-dimensional landmark points may be extracted using, for example, an active shape model (ASM) alignment algorithm, as shown in FIG. 15(a). These two-dimensional landmark points may be converted into three-dimensional points based on their depth values, after which the alignment may be refined, for example, using a registration method based on Singular Value Decomposition (SVD), to obtain the alignment result as shown in FIG. 15(b). Thereafter, depth editing may be performed iteratively in a manner described in the above embodiment so as to obtain a fine alignment result, a refined depth map and a fitted model surface, as shown in FIG. 15(c). As shown in the figure, a refined depth map and a better fitted three-dimensional model can be obtained by the guided depth editing.

To quantitatively evaluate an accuracy of the depth refinement, input depth data is rendered at different distances to provide depth maps with distance-dependent noises and quantization effects. The overall evaluation results are shown in Table 1 below, in which a baseline method is an optimization-based method using a model obtained by removing the face guidance term $$\frac{\beta}{2}\|X - Z^*\|_2^2$$

from the model as defined in Equation (2). The mean absolute error (MAE) is used to measure the difference between the refined depth map and a true value. It can be seen from these results that the proposed guided depth editing can produce more accurate depth refinement. Hence, the solution according to the embodiment of the present disclosure is robust against noises and the effects of quantization step.

TABLE 1

| Distance (meter) | Noise level | Baseline method | Guided depth editing |
|---|---|---|---|
| 1.50 | 32.18 | 4.12 | 3.59 |
| 1.75 | 43.79 | 5.36 | 4.50 |

TABLE 1-continued

| Distance (meter) | Noise level | Baseline method | Guided depth editing |
|---|---|---|---|
| 2.00 | 57.20 | 6.65 | 5.46 |
| 2.30 | 75.65 | 8.11 | 6.13 |

Figure 16:
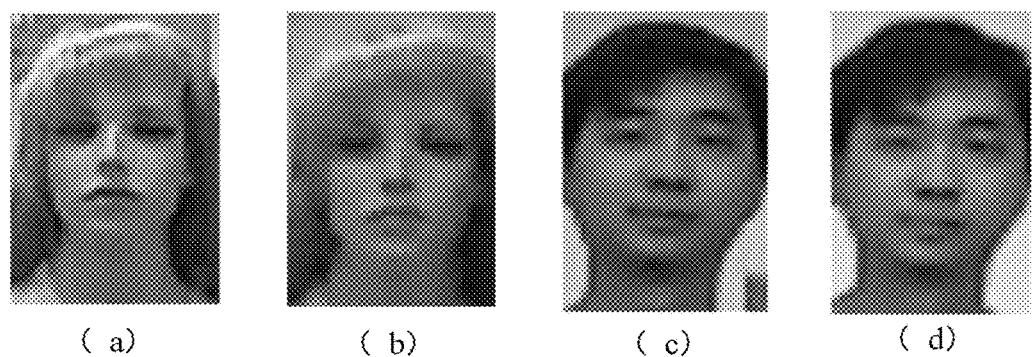
FIG. 16 illustrates example images for testing a processing effect of an exemplary embodiment of the present disclosure.

Then, the refined depth map is used for depth fusion with topology transfer. Here, the depth maps and color images captured by Kinect 1 are used as testing data. FIG. 16 illustrates frames of the captured color images. During the capturing process, the object keeps unchanged so that a better reconstruction of the object can be achieved by the depth fusion. In FIG. 16, (a) shows an image sequence of a mannequin obtained at a distance of 1.6 meters, (b) shows an image sequence of the mannequin obtained at a distance of 2.0 meters, (c) shows an image sequence of a person obtained at a distance of 1.6 meters, and (d) shows an image sequence of a person obtained at a distance of 2.0 meters. To be more intuitive, only the intensity maps are illustrated in FIG. 16.

In a predetermined face model, there are more than two thousand vertices in the face region. Hence, each pixel has a corresponding point in the face region and there is no need to perform an interpolation. Instead, the depth maps are fused together directly, and the pixel-wise topology is transferred to a voxel domain.

Figure 17:
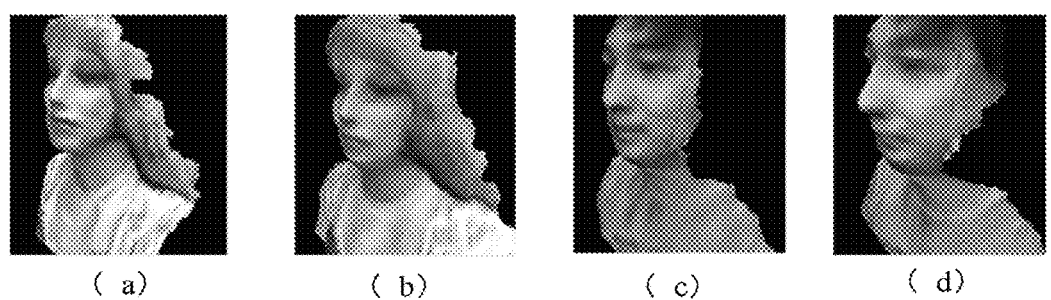
FIG. 17 illustrates 3D models reconstructed based on the example images in FIG. 16 according to an exemplary embodiment of the present disclosure.

As shown in FIG. 17, the fused depth maps provide a three-dimensional model for each RGB-D sequence. In FIG. 17, (a) shows a three-dimensional model reconstructed based on the image sequence of the mannequin obtained at a distance of 1.6 meters, (b) shows a three-dimensional model reconstructed based on the image sequence of the mannequin obtained at a distance of 2.0 meters, (c) shows a three-dimensional model reconstructed based on the image sequence of the human obtained at a distance of 1.6 meters, and (d) shows a three-dimensional model reconstructed based on the image sequence of the human obtained at a distance of 2.0 meters. The illustrated reconstructed model is incomplete since only the images of the frontal part of the head are captured.

Figure 18:
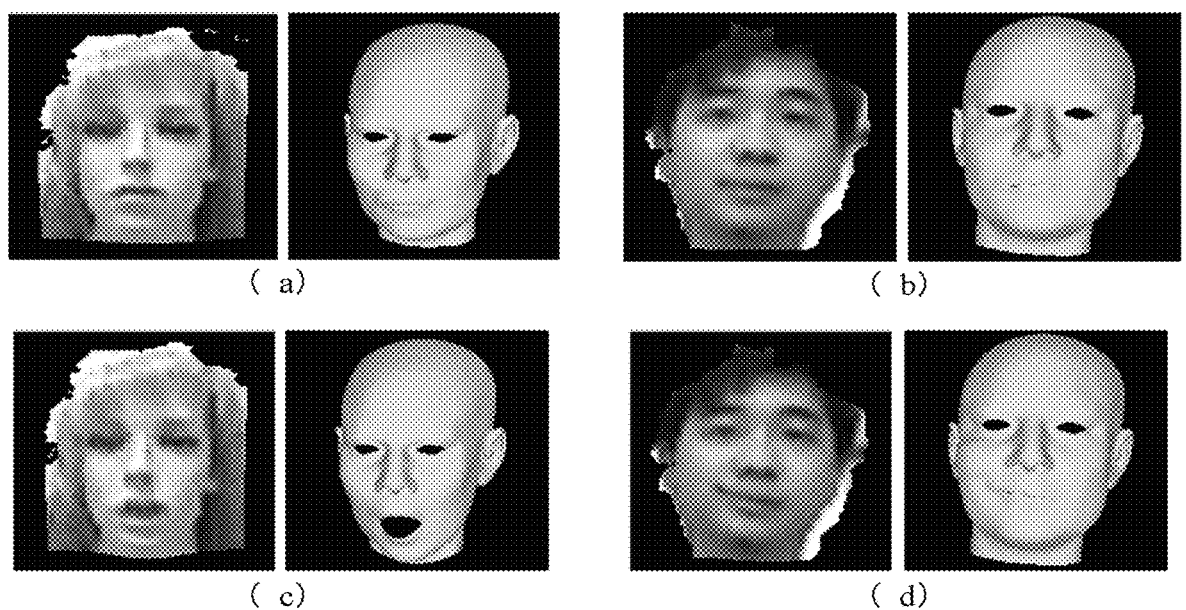
FIG. 18 illustrates deformations performed based on deformation parameters by 3D models reconstructed according to an exemplary embodiment.

Thus, the three-dimensional models of the scanned objects and the deformation methods for these models are reconstructed. Accordingly, semantic deformation of a reconstructed model can be performed by changing a deformation parameter. FIG. 18 shows two examples of the semantic deformation. For each subfigure (a), (b), (c) and (d) of FIG. 18, the left side shows an intensity map obtained by projecting the reconstructed three-dimensional mode to a front view, and the right side shows the predetermined model controlled by a specific deformation parameter set. Specifically, (a) and (b) illustrate the models with deformation parameters being all set as zero (i.e., no deformation). (c) illustrates a model deformed by an "opening mouth" parameter, where both the reconstructed model and predetermined model perform an action of "opening mouth". In (d), both the reconstructed model and the predetermined model are controlled by a "half smile" parameter. It can be seen that the reconstructed models also have semantic deformation parameters.

As an example, each steps of the above-described method and each of constituent modules and/or units of the above-described device may be implemented as software, firmware, hardware, or a combination thereof. In the case that they are implemented as software or firmware, a program constituting the software for implementing the above-described method may be installed from a storage medium or a network to a computer (for example, the general-purpose computer 1000 shown in FIG. 10) having a dedicated hardware structure. The computer can execute various functions when being installed with various programs.

Figure 10:
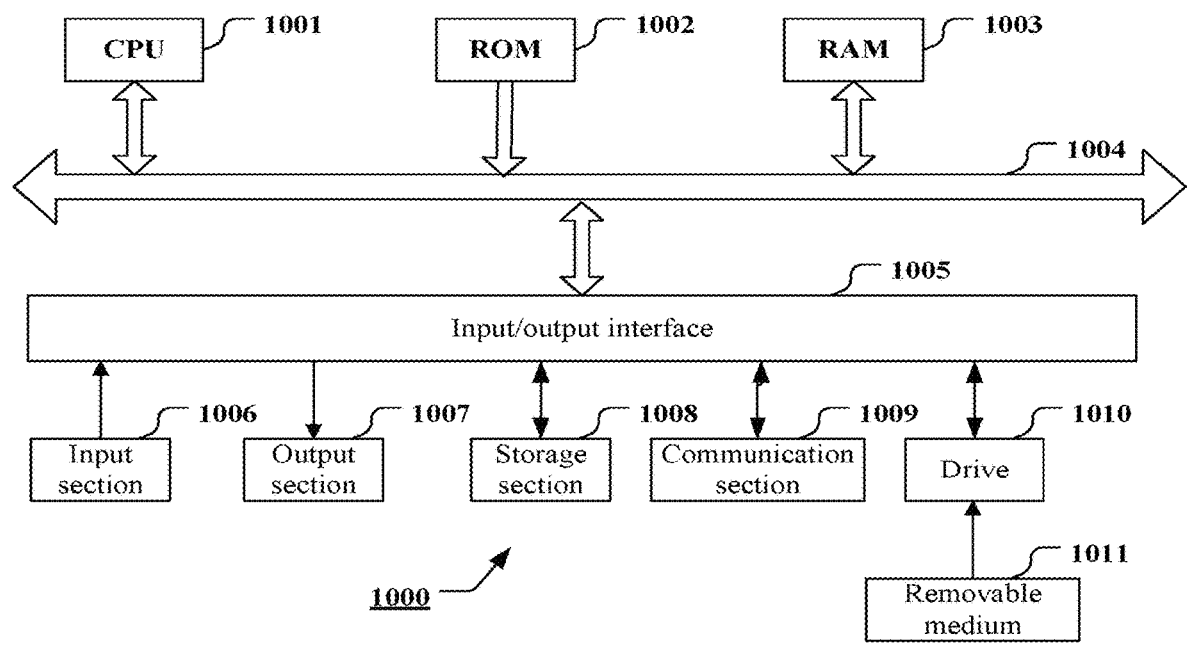
FIG. 10 is a block diagram illustrating an exemplary structure of a computer implementing a method and an apparatus according to the present disclosure.

In FIG. 10, a central processing unit (that is CPU) 1001 executes various processing according to a program stored in a Read Only Memory (ROM) 1002 or a program loaded to a Random Access Memory (RAM) 1003 from a storage section 1008. In the RAM 1003, data required for the CPU 1001 in executing various processing and the like is also stored if necessary. The CPU 1001, the ROM 1002 and the RAM 1003 are connected to each other via a bus 1004. An input/output interface 1005 is also connected to the bus 1004.

The following components are connected to the input/output interface 1005: an input section 1006 including a keyboard, a mouse and the like, an output section 1007 including a display such as a Cathode Ray Tube (CRT) and a Liquid Crystal Display (LCD), a speaker and the like, the storage section 1008 including a hard disk and the like, and a communication section 1009 including a network interface card such as a LAN card, a modem and the like. The communication section 1009 performs communication processing via a network such as the Internet. If necessary, a drive 1010 may also be connected to the input/output interface 1005. A removable medium 1011 such as a magnetic disk, an optical disk, a magneto-optical disk, a semiconductor memory and the like is mounted on the drive 1010 as necessary such that a computer program read out therefrom is installed in the storage section 1008.

If the series of processing above is implemented in software, a program constituting the software is installed from the network such as the Internet or the storage medium such as the removable medium 1011.

It is understood by those skilled in the art that the storage medium is not limited to the removable medium 1011 shown in FIG. 10 in which the program is stored and which is distributed separately from the device so as to provide the program to the user. Examples of the removable medium 1011 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1002, the hard disk contained in the storage section 1008 or the like. The program is stored in the storage medium, and the storage medium is distributed to the user together with the device containing the storage medium.

Embodiments of the present disclosure further involve a program product having stored therein machine-readable instruction code. When the instruction code is read and executed by the machine, the above-described method according to an embodiment of the present disclosure can be executed.

Correspondingly, the storage medium used for carrying the program product including machine-readable instructions is included in the present disclosure. The storage medium includes but not limited to, a floppy diskette, an optical disk, a magneto-optical disk, a memory card, a memory stick and so on.

In the above description of specific embodiments of the present disclosure, the features described and/or illustrated with respect to one embodiment may be used in one or more other embodiments in the same or similar manner as or to that in the embodiment, in combination with features in other embodiments, or replacing features in other embodiments.

It is to be emphasized that the term "comprising/including" as used herein refers to the presence of a feature, element, step or component but does not exclude the presence or addition of one or more other features, elements, steps or components.

In the above embodiments and examples, reference numerals consist of numerals are used to represent each step and/or unit. It will be understood by those skilled in the art that these reference numerals are used for convenience of description and illustration only and are not intended to represent order or any other limit thereof.

In addition, the method of the present disclosure is not limited to be performed in a chronological order described in the specification, but may also be performed in other time-sequentially, in parallel, or independently. Therefore, the order of execution of the methods described in this specification does not limit the technical scope of the present disclosure.

Although the disclosure has been described above with respect to specific embodiments thereof, it is to be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents are intended to be included within the scope of protection of the present disclosure.

The invention claimed is:

1. An information processing apparatus comprising:
a processing circuitry configured to
acquire a depth map of an object and a predetermined three-dimensional model, wherein the predetermined three-dimensional model has a deformation parameter for controlling a deformation of at least a part of the predetermined three-dimensional model;
determine a correspondence between a feature point in the at least a part of the predetermined three-dimensional model and a pixel of the depth map;
generate a reconstructed three-dimensional model of the object from the depth map based on the determined correspondence, the deformation parameter being applicable to the reconstructed three-dimensional model;
register the predetermined three-dimensional model to a point cloud generated based on the depth map to obtain a registered three-dimensional model; and
perform an optimization on the depth map based on the registered three-dimensional model, wherein the optimization comprises deriving an optimized depth map by solving an objective function containing a regularization term for preserving a smoothness of the optimized depth map, wherein the regularization term uses a weighted sum of squares,
wherein the determination of the correspondence includes projecting the registered feature point to an image plane of the depth map, and
wherein the registration includes:
performing an overall rigid registration on the predetermined three-dimensional model and the point cloud,
on the basis of the rigid registration, adjusting the deformation parameter to perform a local non-rigid registration on the predetermined three-dimensional model and the point cloud, and performing the rigid registration and the non-rigid registration iteratively, during which a user instruction from a user interface device is referred to for improving a registration accuracy, so as to fit a shape of the predetermined three-dimensional model to the point cloud.

2. The information processing apparatus according to claim 1, wherein the processing circuitry is configured to perform the registration and the optimization iteratively.

3. The information processing apparatus according to claim 1, wherein the registration comprises registering the predetermined three-dimensional model to the point cloud with an iterative closest point method.

4. The information processing apparatus according to claim 1, wherein the generation of the reconstructed three-dimensional model comprises:
determining a topological relationship between pixels of the depth map from a topological relationship between feature points of the predetermined three-dimensional model, based on the determined correspondence between the feature point of the predetermined three-dimensional model and the pixel of the depth map; and
determining a topological relationship between feature points of the reconstructed three-dimensional model based on the topological relationship between the pixels of the depth map.

5. The information processing apparatus according to claim 4, wherein the determination of the topological relationship between the feature points of the reconstructed three-dimensional model comprises:
in a case that two or more pixels in two or more of the depth map correspond to a same feature point of the predetermined three-dimensional model, obtaining a pixel position corresponding to the feature point by a coordinate averaging;
dividing a three-dimensional space into voxels, converting the depth map into a three-dimensional point cloud, determining a relationship between the point cloud and the voxels according to a nearest neighbor principle;
merging a plurality of three-dimensional point clouds to obtain a voxel-based reconstructed three-dimensional model, a voxel with a value serving as a feature point of the reconstructed three-dimensional model; and
determining the topological relationship between feature points of the reconstructed three-dimensional model based on the correspondence of the pixels of the depth map, the point cloud and the voxels.

6. The information processing apparatus according to claim 1, further comprising:
an image acquisition device configured to acquire the depth map of the object.

7. The information processing apparatus according to claim 1, wherein the processing circuitry is further configured to control a deformation of the reconstructed three-dimensional model and/or the predetermined three-dimensional model based on an operation instruction from the user interface device.

8. The information processing apparatus according to claim 7, wherein the control of the deformation comprises:
guiding a movement of a feature point without topology information based on topology information of an adjacent feature point.

9. The information processing apparatus according to claim 1, wherein the object comprises a human face.

10. A user equipment comprising the user interface device for receiving an operation instruction from the user, wherein
the user equipment comprises or is communicatively coupled with the information processing apparatus according to claim 1, the operation instruction comprising an instruction of specifying or selecting the predetermined three-dimensional model or an instruction of specifying or adjusting the deformation parameter; or
the user equipment comprises or is communicatively coupled with the information processing apparatus, the operation instruction comprising an instruction of specifying or selecting the predetermined three-dimensional model or an instruction related to registering the predetermined three-dimensional model to three-dimensional coordinate points generated from the depth map, to obtain a registered three-dimensional model.

11. An information processing method, comprising:
acquiring a depth map of an object and a predetermined three-dimensional model, wherein the predetermined three-dimensional model has a deformation parameter for controlling a deformation of at least a part of the predetermined three-dimensional model;
determining a correspondence between a feature point in the at least a part of the predetermined three-dimensional model and a pixel of the depth map;
generating a reconstructed three-dimensional model of the object from the depth map based on the determined correspondence, the deformation parameter being applicable to the reconstructed three-dimensional model;
registering the predetermined three-dimensional model to a point cloud generated based on the depth map to obtain a registered three-dimensional model; and
performing an optimization on the depth map based on the registered three-dimensional model, wherein the optimization comprises deriving an optimized depth map by solving an objective function containing a regularization term for preserving a smoothness of the optimized depth map, wherein the regularization term uses a weighted sum of squares,
wherein the determining of the correspondence includes projecting the registered feature point to an image plane of the depth map, and
wherein the registering includes:
performing an overall rigid registration on the predetermined three-dimensional model and the point cloud,
on the basis of the rigid registration, adjusting the deformation parameter to perform a local non-rigid registration on the predetermined three-dimensional model and the point cloud, and
performing the rigid registration and the non-rigid registration iteratively, during which a user instruction from a user interface device is referred to for improving a registration accuracy, so as to fit a shape of the predetermined three-dimensional model to the point cloud.

12. An information processing apparatus, comprising:
a processing circuitry configured to
acquire a depth map of an object and a predetermined three-dimensional model;
register the predetermined three-dimensional model to a point cloud generated based on the depth map to obtain a registered three-dimensional model; and
perform an optimization on the depth map based on the registered three-dimensional model, wherein the optimization comprises deriving an optimized depth map by solving an objective function containing a regularization term for preserving a smoothness of the optimized depth map, wherein the regularization term uses a weighted sum of squares, wherein the registration includes:
  performing an overall rigid registration on the predetermined three-dimensional model and the point cloud,
  on the basis of the rigid registration, adjusting a deformation parameter to perform a local non-rigid registration on the predetermined three-dimensional model and the point cloud, and
  performing the rigid registration and the non-rigid registration iteratively, during which a user instruction from a user interface device is referred to for improving a registration accuracy, so as to fit a shape of the predetermined three-dimensional model to the point cloud.

13. The information processing apparatus according to claim 12, wherein the processing circuitry is configured to perform the registration and the optimization iteratively.

14. An information processing method, comprising:
  acquiring a depth map of an object and a predetermined three-dimensional model;
  registering the predetermined three-dimensional model to three-dimensional coordinate points generated from the depth map, to obtain a registered three-dimensional model; and
  performing an optimization on the depth map based on the registered three-dimensional model, wherein the optimization comprises deriving an optimized depth map by solving an objective function containing a regularization term for preserving a smoothness of the optimized depth map, wherein the regularization term uses a weighted sum of squares, wherein the registering includes:
  performing an overall rigid registration on the predetermined three-dimensional model and a point cloud,
  on the basis of the rigid registration, adjusting a deformation parameter to perform a local non-rigid registration on the predetermined three-dimensional model and the point cloud, and
  performing the rigid registration and the non-rigid registration iteratively, during which a user instruction from a user interface device is referred to for improving a registration accuracy, so as to fit a shape of the predetermined three-dimensional model to the point cloud.

* * * * *